United States Patent
Benninghoff (10) Patent No.: US 12,056,439 B2
(45) Date of Patent: Aug. 6, 2024

(54) SYSTEM AND METHOD FOR FACILITATING USER CREATION OF TEXT COMPLIANT WITH LINGUISTIC CONSTRAINTS

(71) Applicant: Charles Franklyn Benninghoff, Fallbrook, CA (US)

(72) Inventor: Charles Franklyn Benninghoff, Fallbrook, CA (US)

( * ) Notice: Subject to any disclaimer, the term of this patent is extended or adjusted under 35 U.S.C. 154(b) by 0 days.

(21) Appl. No.: 18/450,707

(22) Filed: Aug. 16, 2023

(65) Prior Publication Data

US 2024/0119221 A1 Apr. 11, 2024

Related U.S. Application Data

(60) Provisional application No. 63/378,994, filed on Oct. 10, 2022.

(51) Int. Cl.
| | |
|---|---|
| *G06F 17/00* | (2019.01) |
| *G06F 3/04842* | (2022.01) |
| *G06F 40/166* | (2020.01) |
| *G06F 40/247* | (2020.01) |
| *G06F 40/30* | (2020.01) |

(52) U.S. Cl.
CPC ........ *G06F 40/166* (2020.01); *G06F 3/04842* (2013.01); *G06F 40/247* (2020.01); *G06F 40/30* (2020.01)

(58) Field of Classification Search
CPC ...... G06F 40/166; G06F 40/30; G06F 40/247; G06F 3/04852; G06F 40/253
See application file for complete search history.

(56) References Cited

U.S. PATENT DOCUMENTS

| | | | | |
|---|---|---|---|---|
| 4,773,009 A | * | 9/1988 | Kucera | G06F 40/253 |
| | | | | 715/260 |
| 6,408,266 B1 | * | 6/2002 | Oon | G06F 40/274 |
| | | | | 715/202 |
| 7,013,259 B1 | * | 3/2006 | Polanyi | G06F 40/30 |
| | | | | 704/7 |

(Continued)

FOREIGN PATENT DOCUMENTS

| | | | | |
|---|---|---|---|---|
| WO | WO-2020180895 A1 | * | 9/2020 | ............ G06F 40/211 |
| WO | WO-2024044088 A1 | * | 2/2024 | |

*Primary Examiner* — Laurie A Ries
(74) *Attorney, Agent, or Firm* — Vladimir Postnikov (57) ABSTRACT

Disclosed herein is a text generation system, which is designed to be used either individually or by a group of users. The system can be part of a larger application or can stand alone, being implemented on a user device or a server/cloud computing device. The user interface of the system is designed for user interaction, and the text generation and manipulation module is the core mechanism for text processing. The system offers two distinct operating modes: freeform and classic. In the freeform mode, users can freely input and manipulate text without any constraints. In the classic mode, the system enables users to manipulate text within selected linguistic constraints, such as syllabic structure. Additionally, the system stores previous iterations of text, providing users with an extra layer of control and customization. This system aims to facilitate the transition between different poetic structures and enhance poets' creative process.

11 Claims, 7 Drawing Sheets

(56) References Cited

U.S. PATENT DOCUMENTS

| | | | | |
|---|---|---|---|---|
| 7,762,816 B2* | 7/2010 | Burstein | | G06F 40/58 |
| | | | | 704/270.1 |
| 8,583,614 B1* | 11/2013 | Dilts | | G06F 16/27 |
| | | | | 707/695 |
| 8,755,629 B2* | 6/2014 | Bever | | G06V 30/268 |
| | | | | 382/292 |
| 8,972,240 B2* | 3/2015 | Brockett | | G06F 40/131 |
| | | | | 707/706 |
| 9,947,320 B2* | 4/2018 | Lembersky | | G06Q 10/06398 |
| 10,169,398 B2* | 1/2019 | Huang | | G06F 40/166 |
| 10,630,631 B1* | 4/2020 | Yague | | H04L 51/212 |
| 11,100,290 B2* | 8/2021 | Boada | | G06F 40/247 |
| 11,487,940 B1* | 11/2022 | Ishikawa | | G06F 40/216 |
| 11,586,810 B2* | 2/2023 | Wu | | G06N 5/022 |
| 11,699,033 B2* | 7/2023 | Peleg | | G06F 40/247 |
| | | | | 715/256 |
| 2008/0313243 A1* | 12/2008 | Poston | | G06F 40/197 |
| | | | | 707/999.203 |
| 2010/0332217 A1* | 12/2010 | Wintner | | G06F 40/211 |
| | | | | 704/9 |
| 2011/0041103 A1* | 2/2011 | Kurzweil | | G06F 40/56 |
| | | | | 715/867 |
| 2013/0047078 A1* | 2/2013 | Bever | | G06V 30/268 |
| | | | | 715/245 |
| 2014/0088953 A1* | 3/2014 | Iantosca | | G06F 40/253 |
| | | | | 704/9 |
| 2014/0114642 A1* | 4/2014 | van den Oever | | G06F 40/44 |
| | | | | 704/2 |
| 2014/0278369 A1* | 9/2014 | Cassimatis | | G06F 40/30 |
| | | | | 704/9 |
| 2017/0109340 A1* | 4/2017 | Chen | | G06F 40/151 |
| 2017/0286390 A1* | 10/2017 | Yashpe | | G06F 40/253 |
| 2018/0203851 A1* | 7/2018 | Wu | | G06N 3/006 |
| 2018/0268792 A1* | 9/2018 | Serletic | | G10H 1/0025 |
| 2018/0322121 A1* | 11/2018 | Barker | | G06F 16/284 |
| 2021/0110112 A1* | 4/2021 | Timm | | G06F 40/289 |
| 2022/0129443 A1* | 4/2022 | Nadeau | | G06F 21/64 |

* cited by examiner

SYSTEM AND METHOD FOR FACILITATING USER CREATION OF TEXT COMPLIANT WITH LINGUISTIC CONSTRAINTS

CROSS REFERENCE AND PRIORITY

This application claims the benefit of U.S. Provisional Application No. 63/378,994, filed Oct. 10, 2022, which is incorporated herein by reference in its entirety for all purposes.

TECHNICAL FIELD

The present disclosure is generally related to the field of text generation. More particularly, the present disclosure is related to a system and method for facilitating user generation and manipulation of linguistic text for compliance with user-selected linguistic constraints. This invention is known as ELECTIVE LATITUDE LONGEVITY ADJUSTOR or "ELLA".

BACKGROUND OF THE INVENTION

A haiku is a form of traditional Japanese poetry that is composed of three lines and has a unique syllabic structure. The first and last lines consist of five syllables, while the middle line contains seven. Haikus are known for their simplicity and brevity, often capturing a fleeting moment or a nuanced observation about nature or the human experience. The beauty of a haiku lies in its ability to convey a profound or evocative message within its highly structured format. This form of poetry challenges poets to condense their thoughts and emotions into just seventeen syllables, creating a vivid image or sensation that resonates with the reader.

Freeform poetry, also known as free verse, breaks away from the traditional rules of poetry concerning meter, rhyme, and structure. It does not adhere to any strict syllable count, rhyme scheme, or stanza arrangement. In essence, the form of the poem is determined by the content and the poet's vision. Freeform poetry relies heavily on the use of other poetic devices such as imagery, alliteration, assonance, and enjambment. It allows for greater creative freedom, enabling poets to articulate their thoughts, feelings, and observations in a more flexible and individualistic manner. Despite the lack of conventional constraints, creating effective free verse poetry requires a keen understanding of language and a strong command over its rhythm and flow.

For both new and seasoned poets, the practice of alternating between freeform poetry and haikus can offer significant benefits in expanding their creative range and enriching the content of their poems. Freeform poetry offers a vast, unrestricted canvas that allows poets to explore different ideas and express their thoughts without limitations. This freedom can help stimulate creativity and provide an avenue to experiment with various poetic devices like alliteration, imagery, and enjambment. It encourages poets to delve deep into their thoughts and emotions, enabling them to articulate complex concepts or abstract ideas that might be challenging to express within a structured format.

On the other hand, the stringent structure of a haiku offers a completely different challenge. It requires the poet to distill their thoughts and observations into a concise, potent form. The constraint of seventeen syllables necessitates precision and careful word choice. It pushes poets to create vivid, evocative imagery with brevity and conciseness, enhancing their ability to capture the essence of a moment or a feeling. Working within this framework can also help poets to better understand the value of each word, and the power it holds in contributing to the overall impact of a poem.

By alternating between the freedom of free verse and the discipline of haikus, poets can develop a more well-rounded understanding of different poetic forms, cultivate flexibility in their writing, and enrich their creative repertoire. This ultimately broadens their perspective and deepens their poetic voice, enhancing the quality and depth of their work.

Accordingly, there is a need in the field of poetry for a system and method of use that facilitates the transition between different poetic structures such as freeform and haiku, aiding poets in their creative process. Such a system would help poets not only explore and master various poetic forms but also provide a dynamic platform for honing their skills, expanding their creative range, and enhancing the depth and diversity of their work.

BRIEF DESCRIPTION OF THE INVENTION

The invention disclosed refers to a text generation system, which is designed to be used either individually or by a group of users. The system can be part of a larger application or can stand alone, being implemented on a user device or a server/cloud computing device. The user interface of the system is designed for user interaction, and the text generation and manipulation module is the core mechanism for text processing.

The system communicates with two primary databases, the word syllable database and the thesaurus database, which could be located remotely and accessed via a network, such as the internet, or pre-loaded onto the user's device or the server/cloud computing device. These databases provide the necessary resources for text manipulation and generation.

A significant feature of the system is its two distinct operating modes: freeform and classic. In the freeform mode, users can freely input and manipulate text without any constraints. Any text entered and manipulated in this mode becomes the 'current text'. When the user switches to the classic mode for the first time for a given text, the 'current text' is stored as the freeform save state and the classic save state. The classic mode allows the user to further manipulate this text but within selected linguistic constraints.

In classic mode, the system analyzes the user's text for compliance with the selected linguistic constraints. If no constraints have been selected, the user is prompted to choose. The user can select different constraints while in either mode. The system displays the analysis results, highlighting the text's compliance or non-compliance with the selected linguistic constraints.

The system assists users in classic mode to increase text compliance with the selected linguistic constraints. When the user hovers over a word, the system suggests potential replacement words, which are synonyms or related concepts obtained from the word syllable database. The user can then select a suggested replacement word, which replaces the hovered word in the current text.

In another embodiment, the system adapts when the user switches from freeform mode to classic mode. The system truncates the current text displayed in the freeform mode to meet the user-selected syllabic constraints in the classic mode. The system uses the text generation and manipulation module in conjunction with the word syllabus database to accomplish this.

In some embodiments, the user interface of the system features various controls and displays. It includes radio buttons that allow users to switch between classic and freeform modes. Text entry boxes are provided for entering and manipulating the text. There are also verbal message boxes and compliance icons which provide feedback on whether the user-inserted text complies with the previously selected linguistic constraints.

When in freeform mode, the system doesn't enforce compliance with the selected linguistic constraints. The verbal message boxes display the syllabic count of each line of user input text. However, if the user switches to classic mode, the system automatically adjusts the text to comply with the any preselected linguistic constraints.

The system also stores previous iterations of text. When a user returns to freeform mode, the text in the entry boxes can be replaced with the most recently saved previous iteration. Alternatively, in other embodiments, the user can select any saved previous iteration, offering the user an extra layer of control and customization.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION

In the following description, to better understand the aforementioned purposes, features, and advantages of the present invention, numerous specific details are set forth in order to provide a thorough understanding of the claimed subject matter. It should be noted that these details and examples are provided to merely aid in understanding the descriptions, and they do not, in any way, limit the scope of the present invention. The present invention can also be implemented in other modes different from those described herein and the present invention is not limited to the specific embodiments disclosed below.

The present invention may be a system, a method, and/or a computer program product at any possible technical detail level of integration. The computer program product may include a computer-readable storage medium (or media) having computer-readable program instructions thereon for causing a processor to carry out aspects of the present invention. The specification may refer to "an", "one" or "some" embodiment(s) in several locations. This does not necessarily imply that each such reference is to the same embodiment(s), or that the feature only applies to a single embodiment. A single feature of different embodiments may also be combined to provide other embodiments The computer-readable storage medium ("memory") can be a tangible device that can retain and store instructions for use by an instruction execution device. The computer-readable storage medium may be, without limitation, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including, but not limited to, an object oriented programming language such as Python, Java, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the singular forms "a", "an" and "the" are intended to include the plural forms as well, unless expressly stated otherwise, It will be further understood that the terms "includes", comprises", including" and/or "comprising" when used in this specification, specify the presence of stated features, integer steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The following detailed description of example implementations refers to the accompanying drawings. The same reference numbers in different drawings may identify the same or similar elements.

As used herein, the terms "component" and "module" are intended to be broadly construed as hardware, firmware, or a combination of hardware and software.

No element, act, or instruction used herein should be construed as critical or essential unless explicitly described as such.

The disclosed invention focuses on a text generation platform, designed to aid users in generating and manipulating text to comply with their chosen linguistic constraints. It can operate on a variety of computing devices including smartphones, tablets, laptops, and desktop computers, which are referred to as 'user devices' in this context.

The text generation system includes a component called 'joining software.' This software could comprise one or more computer programs or software applications. An application, intended to run on the user device, can be downloaded and installed on said device.

The applications feature a range of tools and functions, one of them being a user interface that allows users to interact with the text generation system. It also includes a text generation and manipulation module, which is designed to communicate with the word syllable database and thesaurus database.

The text generation system further includes a server device. This device, housing one or more processors and memory, is designed to facilitate the user's generation and manipulation of linguistic text. The server device can connect to the user device, a communication often facilitated by the application installed on the user device. This server device could be a physical web server, a cloud server, or a combination thereof, all options being capable of delivering processing power, storage, and applications.

When the text generation and manipulation program is executed by the server device's processors, the server device is set up to receive information from the user device.

In one embodiment, the system allows users to generate and manipulate text without conforming to any recommended linguistic constraints. This way of using the system is referred to as the 'freeform mode.'

In one embodiment, users can use the system to generate and manipulate text to meet specific linguistic constraints they have chosen. This use of the system is referred to as 'classic mode'. For instance, if a user is creating text in classic mode, they might choose to follow the traditional 5-7-5 syllable pattern of a haiku. With these constraints, the system will help the user generate text that adheres to the rules of the chosen pattern.

In another embodiment, the system allows users to seamlessly switch between freeform and classic mode while manipulating text, using a feature called 'save-state functionality.' In this case, when a user changes from freeform mode to classic mode, the text they created in freeform mode is kept in a 'freeform save state.' Similarly, when they switch from classic to freeform mode, the text created in classic mode is stored in a 'classic save state.'

If a user returns to freeform mode, they can access the text previously created and preserved in the freeform save state. Similarly, if they return to classic mode, they can access the text previously created and saved in the classic save state. This feature ensures that users' linguistic ideas are kept intact in freeform mode and can be easily edited in classic mode. It gives users the freedom to switch between the two modes as they see fit to accomplish their linguistic and artistic goals.

Embodiments of the invention are discussed below with references to the figures. However, those skilled in the art will readily appreciate that the detailed description given herein with respect to these figures is for explanatory purposes as the invention extends beyond these limited embodiments. While particular embodiments are shown and described throughout this application, it will be obvious to those skilled in the art that, based upon the teachings herein, that changes and modifications may be made without departing from this invention and its broader aspects.

Figure 1:
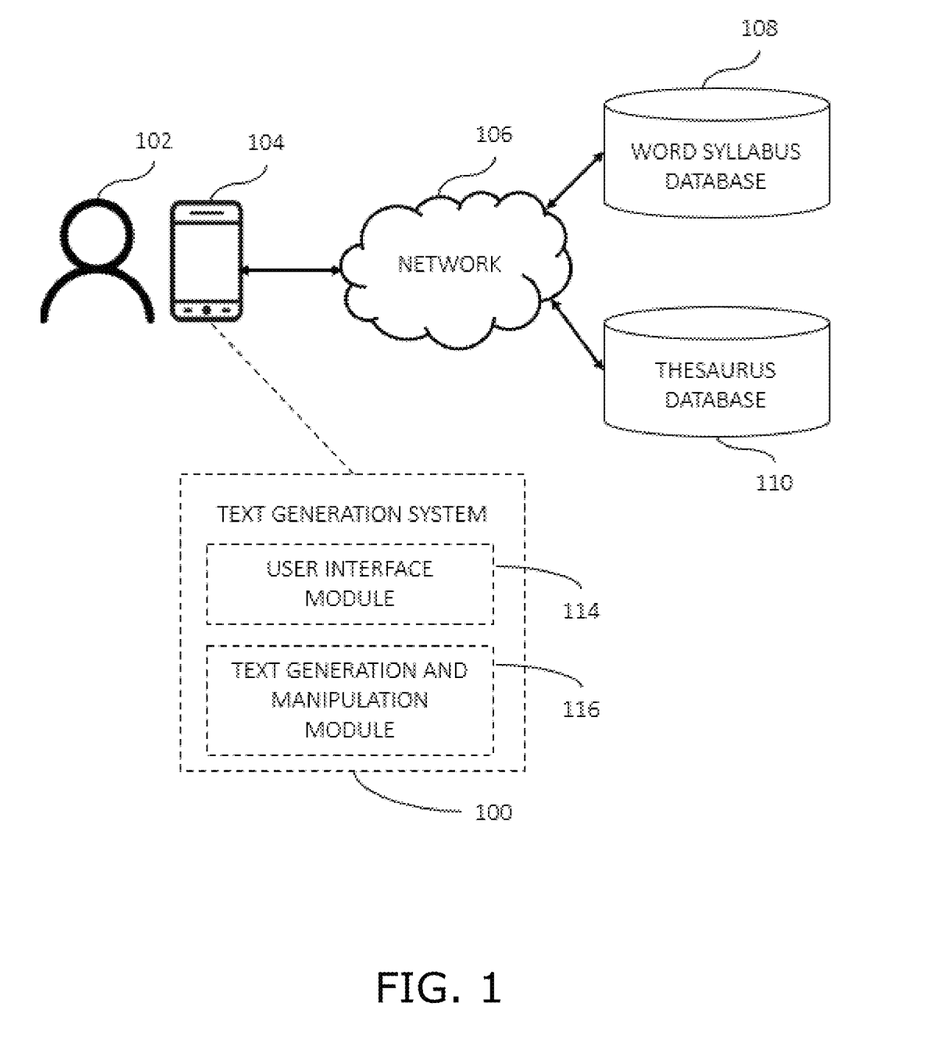
FIG. 1 is a schematic diagram illustrating a text generation system on a client computing device being utilized by a user, in accordance with aspects of the disclosure.
Figure 2:
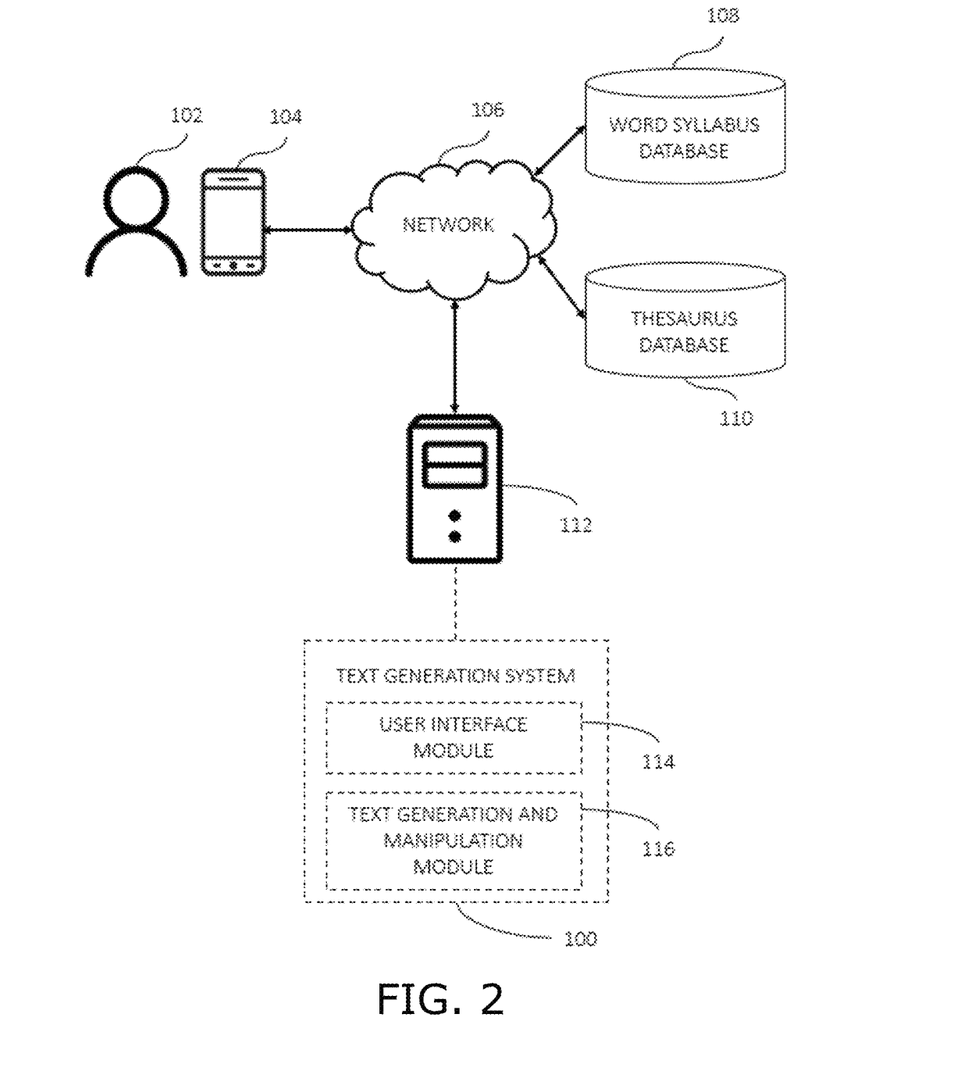
FIG. 2 is a schematic diagram illustrating a text generation system on a server computing device being utilized by a user via a client computing device, in accordance with aspects of the disclosure.

Referring to the figures, FIG. 1 and FIG. 2 illustrate different examples of a text generation system 100 being utilized by a user 102, in accordance with aspects of the disclosure. In some aspects, the system 100 is part of a larger application. In other aspects, the system 100, is a standalone application utilized by a user device 104 or a server/cloud computing device 114. A user 102 as utilized herein refers to an individual user of the system 100 or to a group of users of the system 100 that may be identified with a single identification, such as group A users.

The text generation system 100 includes a user interface module 114 and a text generation and manipulation module 116. In some embodiments, the system 100 communicates with the word syllable database 108 and the thesaurus database 110 via a network 106. In some aspects, the network 106 is a distributed computing network, such as the internet. In other embodiments, the word syllable database 108 and the thesaurus database 110 may be pre-loaded onto the user device 104 or the server/cloud computing device 112.

In some aspects, the system 100 is implemented on the user device 104 as illustrated by FIG. 1.

In other aspects, the system 100 is implemented on the server/cloud computing device 112, as illustrated in FIG. 2. The server/cloud computing device 112 may provide data to and/or receive data from the user device 104 through the network 106. In further aspects, said system 100 is implemented on more than one server/cloud computing device 112, such as a plurality or network of server/cloud computing devices 112.

Figure 3:
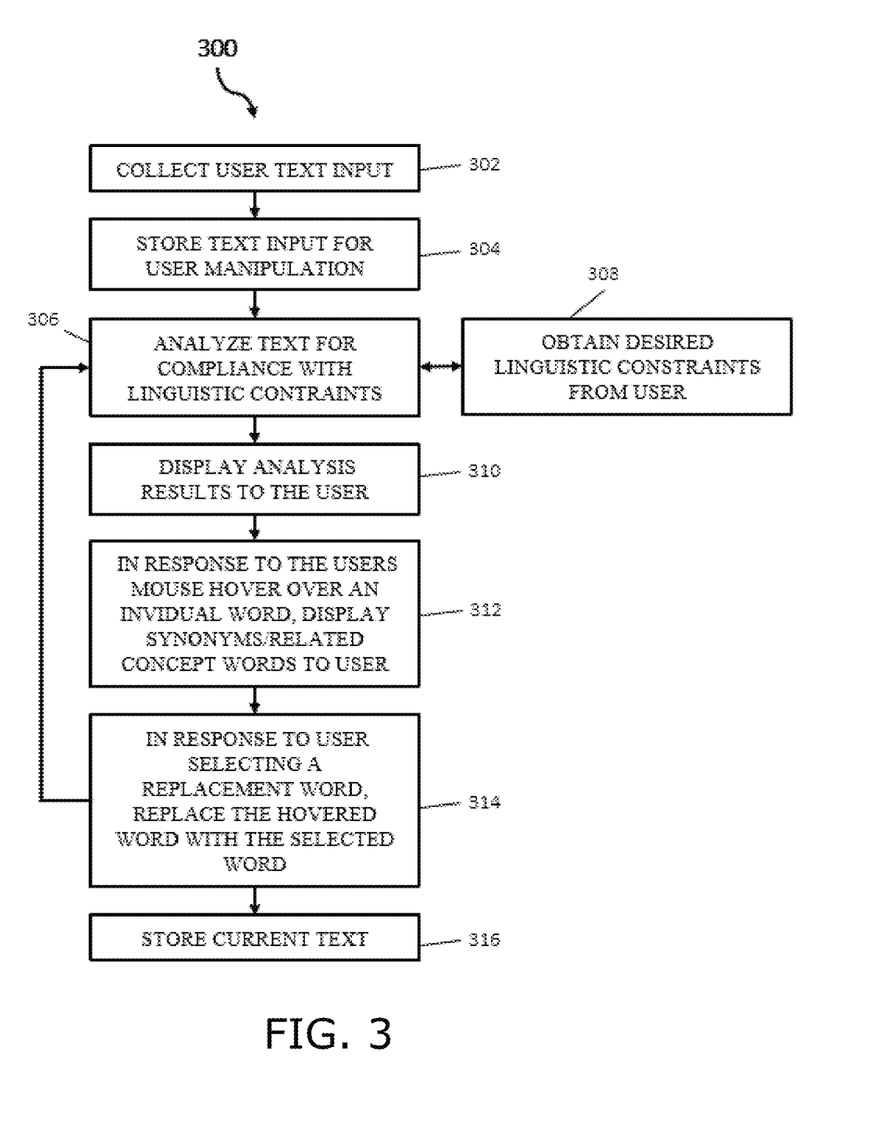
FIG. 3 is a block flow diagram illustrating a method for generating and manipulating linguistic text for compliance with user selected linguistic constraints.

FIG. 3 is a block flow diagram illustrating a method for generating and manipulating linguistic text for compliance with user-selected linguistic constraints 300. The text displayed to a user for manipulation is herein referred to as the "current text". Initially, the freeform and classic save states, which store text, as well as the current text, are empty. First, user text input is collected during freeform mode 302 as the user manipulates the current text. In response to the user alternating to classic mode for the first time for a given text, the current text generated during freeform mode is stored as the freeform save state and the classic save state. In classic mode, the user can manipulate the text stored in the classic save state. Next, said text is analyzed for compliance with the desired linguistic constraints 306. If the desired linguistic constraints have not yet been selected, the user is prompted to select their desired linguistic constraints 308. The user may optionally select different desired linguistic constraints while in classic mode or while in freeform mode. The results of the analysis are then displayed to the user, alerting the user as to the compliance of their current text with the selected linguistic constraints 310. To increase compliance with the selected linguistic constraints, the user may wish to manipulate the current text. Such manipulation can be achieved by the user editing the text directly. Additionally, in response to the user hovering over an individual word, the system can display synonyms and related concept words to the user as suggested potential replacements for said individual word 312. Said synonyms and related concept words are obtained from the word syllable database (as shown in FIG. 1 and FIG. 2). In response to a user selecting a suggested replacement word to replace the hovered word, the hovered word is replaced by the selected word in the current text 314. Steps 306 to 314 can be repeated until the user is satisfied with the compliance of the current text with the selected linguistic constraints. The user can manually save the freeform save state and classic save state text 316 at any time for further later manipulation or as a final version.

In some embodiments, when switching from the freeform mode to classic mode, the current text displayed is the freeform save state text cut down to not exceed the user selected syllabic constraints. For example, if a first line read "Humpty Dumpty Sat Humpty Dumpty Sat Humpty Dumpty Sat" in freeform mode and the user switched to classic mode where the first line was limited to 5 syllables, the freeform save state for the first line would be updated to be "Humpty Dumpty Sat Humpty Dumpty Sat Humpty Dumpty Sat" and the current text displayed for the first line would be "Humpty Dumpty Sat" (the freeform save state for the first line shortened to 5 syllables utilizing the text generation and manipulation module and the word syllabus database).

Figure 4:
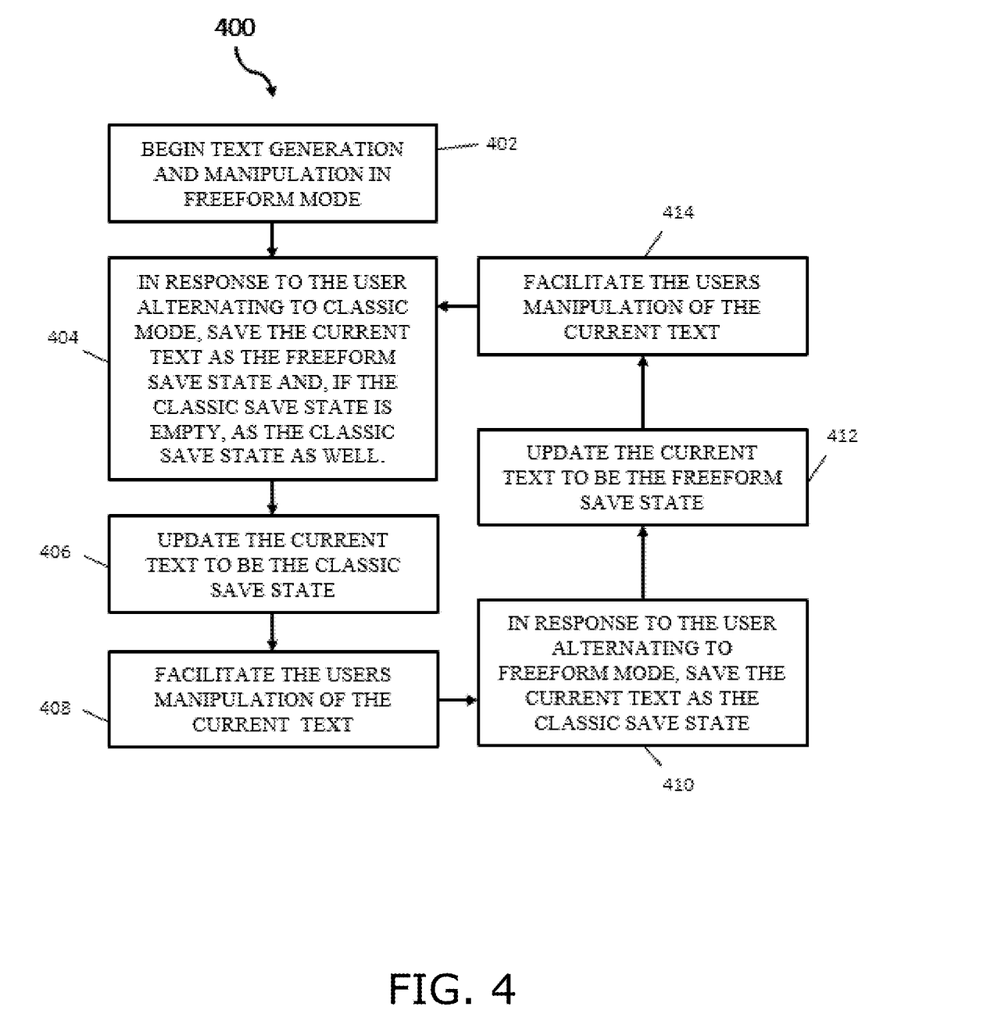
FIG. 4 is a block flow diagram illustrating a method for preserving user ideas.

FIG. 4 is a block flow diagram illustrating a method for preserving user ideas using save states 400. Initially, a user begins the text generation and manipulation process in freeform mode 402. In response to the user alternating to classic mode, the user generated current text is saved as the freeform save state and, if the classic save state is empty, as the classic save state as well 404. The current text is then updated to be the text stored in the classic save state 406. The user can then manipulate the current text while in classic mode 408. In response to the user alternating to freeform mode, the current text is stored in the classic save state 410. The current text is then updated to be the text stored in the freeform save state 412. The user can then manipulate the current text while in freeform mode 414. The user can freely alternate between freeform mode and classic mode.

Figure 5:
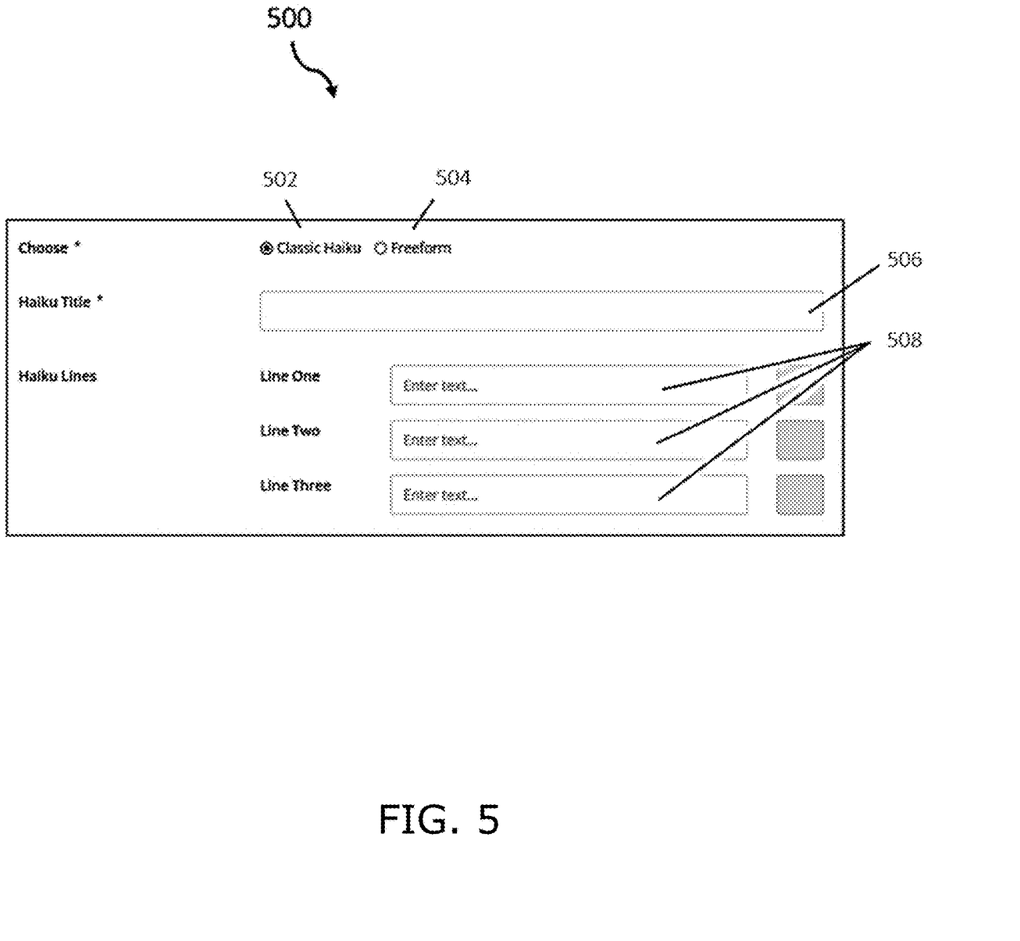
FIG. 5 illustrates an exemplary user interface in accordance with some embodiments.

FIG. 5 is a block flow diagram illustrating another method for generating and manipulating linguistic text for compliance with user-selected linguistic constraints 500. Prior to use of this method, a linguistic syllabic constraint pattern is selected by the user. For example, and without limitation, the desired user-selected linguistic constraints may be the classical haiku 5-7-5 syllable pattern. Once a linguistic syllabic constraint pattern has been selected by a user, a user interface 600 will be displayed on the user device 104.

FIG. 5 illustrates an exemplary user interface 500 in accordance with some embodiments. The text generation system's user interface module displays the user interface 500 to the user via a display surface of the user device. The user interface 500 includes radio buttons that allow a user 100 to transition between classic haiku mode 502 and freeform mode 504, a title text entry box 506 for a haiku's title, and one or more line text entry boxes for user generated text 508. One of ordinary skill in the art would recognize that the functionality of the exemplary user interface 500 may be implemented in various ways not explicitly described herein.

Figure 6:
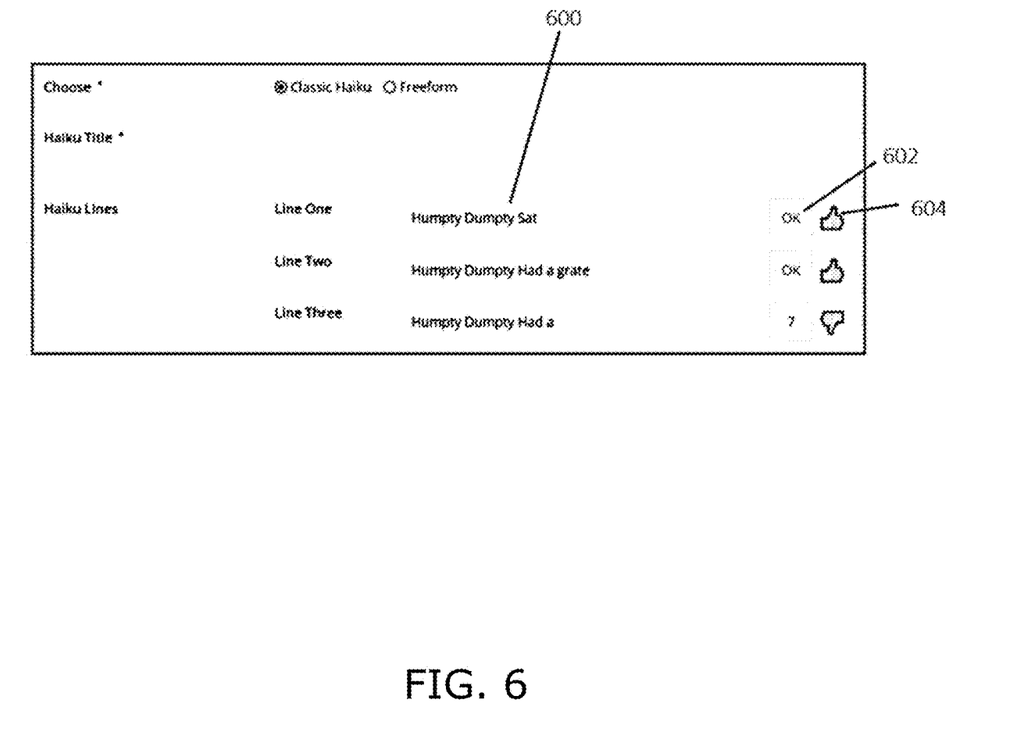
FIG. 6 illustrates the exemplary user interface of FIG. 5 where the user manipulates text while in classical haiku mode.

FIG. 6 illustrates the exemplary user interface of FIG. 5 where the user manipulates text while in classical haiku mode. As seen in FIG. 6, the exemplary user interface of FIG. 5 further includes one or more verbal message boxes 602 and one or more compliance icons 604, the verbal message boxes and compliance icons each corresponding to a singular line text entry box. The verbal message boxes 602 can display verbal or numerical information signifying whether the user inserted text of the corresponding line text entry box complies with the linguistic syllabic constraint pattern previously selected by the user. The compliance icons 604 can display an image signifying whether the user inserted text of the corresponding line text entry box complies with the linguistic syllabic constraint pattern previously selected by the user. For exemplary purposes, line one contains the user inserted text 600 "Humpty Dumpty Sat". Here, the user inserted text 600 complies with the syllabic requirements of classic haiku mode as it has 5 syllables. Accordingly, the first verbal message box displays "OK" and the first compliance icon is a thumbs up. In contrast to line one, line three contains the text "Humpty Dumpty Had a" which does not comply with the syllabic requirements of the classic haiku mode as it has 6 syllables. Accordingly, this non-compliance is displayed to the user via the verbal message box and the compliance icon corresponding to line three. One of ordinary skill in the art would recognize that the compliance information displayed to the user via the one or more verbal message boxes and the one or more compliance icons may be implemented in various ways not explicitly described herein.

Figure 7:
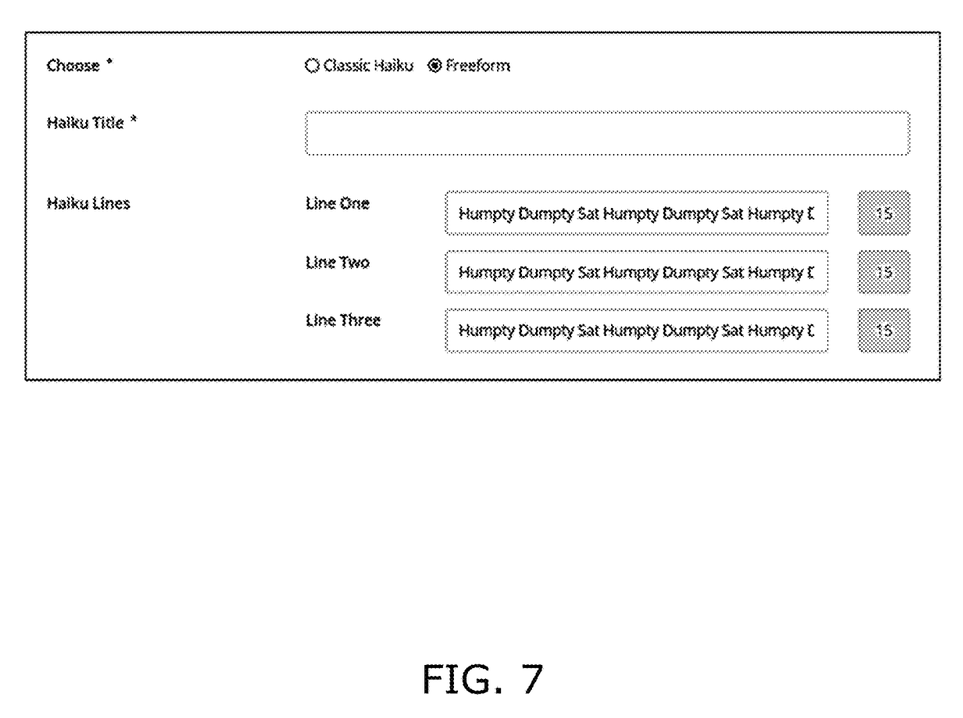
FIG. 7 illustrates the exemplary user interface of FIG. 5 where the user manipulates text while in freeform mode.

FIG. 7 illustrates the exemplary user interface of FIG. 5 where the user manipulates text while in freeform mode. While in freeform mode, compliance icons are not displayed to the user as user text compliance with the selected linguistic constraints is not required. The syllabic count of each user input text is displayed in the corresponding verbal message box. For exemplary purposes, lines one, two, and three each contain the text "Humpty Dumpty Sat Humpty Dumpty Sat Humpty Dumpty Sat". Accordingly, the corresponding verbal message boxes each display a syllabic count of 15. Here, if the user were to return to classical haiku mode, the user inserted text of each line text entry box would be manipulated by the text generation and manipulation module to comply with the user selected linguistic syllabic constraint pattern by removing the extra words from each user inserted text. Continuing the current example, if the user returned to classical haiku mode, the current user text of each line text entry box would be saved as a previous iteration and compliance with the user selected linguistic syllabic constraint patent would result in line one reading "Humpty Dumpty Sat", line two reading "Humpty Dumpty Sat Humpty", and line three reading "Humpty Dumpty Sat". If the user then returns to freeform mode, each line text entry box would contain the most recently saved previous iteration. Continuing the current example, if the user returned to freeform mode, lines one, two, and three would read "Humpty Dumpty Sat Humpty Dumpty Sat Humpty Dumpty Sat". This embodiment only allows for the most recently saved previous iteration to be utilized when the user returns to freeform mode.

In other embodiments, the user can select a previous iteration from all saved previous iterations. In such embodiments, the user selected previous iteration will replace the text in the currently displayed in the corresponding line text entry box.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method for facilitating user creation of text compliant with linguistic constraints. comprising the following steps:
   collecting user text input in a first mode;
   storing the user text input as a current text;
   analyzing the current text for compliance with a first set of linguistic constraints;
   displaying the results of the analysis;
   upon the user switching to a second mode for the first time:
   storing the current text as a first save state:
   additionally storing the current text as a second save state;
   analyzing the current text for compliance with a second set of linguistic constraints. which includes at least a constraint on the number of syllables:
   modifying the current text to comply with the syllabic constraint:
   displaying the results of the analysis:
   upon the user switching back to the second mode subsequently:
   storing the current text as a first save state;
   loading the current text from the second save state;
   analyzing the current text for compliance with the second set of linguistic constraints;
   modifying the current text to comply with the syllabic constraint:
   displaying the results of the analysis:
   wherein the current text can be updated at any time;
   wherein modifying the current text to adhere to the syllabic constraint includes truncating an end portion of the text.

2. The method of claim 1, wherein the syllable count of the modified text is maximized within the limits set by the syllabic constraint, which may include segmenting words into their constituent parts if necessary.

3. The method of claim 2, further comprising the steps of:
upon the user alternating to the first mode:
- storing the current text as a second save state;
- loading the current text from the first save state;
- analyzing the current text for compliance with a first set of linguistic constraints; and,
- displaying the analysis results.

4. The method of claim 3, further comprising the steps of:
- displaying one or more replacement words for potential selection in response to a user engaging one or more words in the current text;
- replacing the selected one or more words with a user selected one or more replacement words.

5. The method of claim 4, wherein if the first set of linguistic constraints and the second set of linguistic constraints are not selected by a user prior to the step of collecting a user text input in a first mode, a default first set of linguistic constraints and a default second set of linguistic constraints are used.

6. The method of claim 5, wherein each time the user alternates between the first mode and the second mode, the first save state is added to a first save state list or the second save state is added to a second save state list and wherein the user, when in the first mode, can update the current text to any first save state from the first save state list and, when in the second mode, can update the current text to any second save state from the second save state list.

7. The method of claim 4, wherein if the first set of linguistic constraints and the second set of linguistic constraints are not selected by a user prior to the step of collecting a user text input in a first mode, a default first set of linguistic constraints and a default second set of linguistic constraints are used.

8. The method of claim 7, wherein each time the user alternates between the first mode and the second mode, the first save state is added to a first save state list or the second save state is added to a second save state list and wherein the user, when in the first mode, can update the current text to any first save state from the first save state list and, when in the second mode, can update the current text to any second save state from the second save state list.

9. The method of claim 1, wherein the syllable count of the modified text is maximized within the limits set by the syllabic constraint and wherein no words of the pre-modified text are segmented into constituent words.

10. The method of claim 9, further comprising the steps of:
upon the user alternating to the first mode:
- storing the current text as a second save state;
- loading the current text from the first save state;
- analyzing the current text for compliance with a first set of linguistic constraints; and,
- displaying the analysis results.

11. The method of claim 10, further comprising the steps of:
- displaying one or more replacement words for potential selection in response to a user engaging one or more words in the current text;
- replacing the selected one or more words with a user selected one or more replacement words.

* * * * *